United States Patent
Das et al.

(10) Patent No.: US 12,169,782 B2
(45) Date of Patent: Dec. 17, 2024

(54) DYNAMIC PRECISION SCALING AT EPOCH GRANULARITY IN NEURAL NETWORKS

(71) Applicant: ADVANCED MICRO DEVICES, INC., Santa Clara, CA (US)

(72) Inventors: Shomit N. Das, Austin, TX (US); Abhinav Vishnu, Austin, TX (US)

(73) Assignee: Advanced Micro Devices, Inc., Santa Clara, CA (US)

(*) Notice: Subject to any disclaimer, the term of this patent is extended or adjusted under 35 U.S.C. 154(b) by 952 days.

(21) Appl. No.: 16/425,403

(22) Filed: May 29, 2019

(65) Prior Publication Data
US 2020/0151573 A1     May 14, 2020

Related U.S. Application Data

(60) Provisional application No. 62/758,853, filed on Nov. 12, 2018.

(51) Int. Cl.
    *G06N 3/084*         (2023.01)
    *G06N 3/04*          (2023.01)

(52) U.S. Cl.
    CPC .............. *G06N 3/084* (2013.01); *G06N 3/04* (2013.01)

(58) Field of Classification Search
CPC ........ G06N 3/084; G06N 3/04; G06N 3/0454; G06N 3/0481
See application file for complete search history.

(56) References Cited

U.S. PATENT DOCUMENTS

| | | | |
|---|---|---|---|
| 2016/0189059 A1 | 6/2016 | Ishii | |
| 2016/0358043 A1 | 12/2016 | Mu et al. | |
| 2018/0322391 A1 | 11/2018 | Wu et al. | |
| 2018/0341851 A1* | 11/2018 | Chung | G06N 3/082 |

(Continued)

FOREIGN PATENT DOCUMENTS

KR    10-2018-0045635 A    5/2018

OTHER PUBLICATIONS

Na, Taesik, and Saibal Mukhopadhyay. "Speeding up convolutional neural network training with dynamic precision scaling and flexible multiplier-accumulator." Proceedings of the 2016 International Symposium on Low Power Electronics and Design. 2016. (Year: 2016).*

(Continued)

*Primary Examiner* — Miranda M Huang
*Assistant Examiner* — Sidney Vincent Bostwick

(57) ABSTRACT

A processor determines losses of samples within an input volume that is provided to a neural network during a first epoch, groups the samples into subsets based on losses, and assigns the subsets to operands in the neural network that represent the samples at different precisions. Each subset is associated with a different precision. The processor then processes the subsets in the neural network at the different precisions during the first epoch. In some cases, the samples in the subsets are used in a forward pass and a backward pass through the neural network. A memory configured to store information representing the samples in the subsets at the different precisions. In some cases, the processor stores information representing model parameters of the neural network in the memory at the different precisions of the subsets of the corresponding samples.

20 Claims, 6 Drawing Sheets

(56) References Cited

U.S. PATENT DOCUMENTS

2019/0340499 A1* 11/2019 Burger ............... G06N 3/0454
2020/0364823 A1* 11/2020 Ould-Ahmed-Vall .....................
G06F 9/3863

OTHER PUBLICATIONS

Hou, Lu, and James T. Kwok. "Loss-aware weight quantization of deep networks." arXiv preprint arXiv:1802.08635 (2018). (Year: 2018).*

Taras, Ian, and Dylan Malone Stuart. "Quantization error as a metric for dynamic precision scaling in neural net training." arXiv preprint arXiv:1801.08621 (2018). (Year: 2018).*

Drumond, Mario, et al. "Training dnns with hybrid block floating point." Advances in Neural Information Processing Systems 31 (2018). (Year: 2018).*

Taylor, Ben et al., "Adaptive Selective of Deep Learning Models on Embedded Systems", Metalab, School of Computing and Communications, Lancaster University, United Kingdom, May 2018, 20 pages.

International Search Report and Written Opinion mailed Feb. 24, 2020 for International Application No. PCT/US2019/059850, 10 pages.

International Preliminary Report on Patentability mailed May 20, 2021 for International Application No. PCT/US2019/059850, 7 pages.

Courbariaux, Matthieu, et al., "BinaryConnect: Training Deep Neural Networks with Binary Weights During Propagations", arXiv:1511.00363v3 [cs.LG], Apr. 18, 2016, 9 pages.

Courbariaux, Matthieu, et al., "Training Deep Neural Networks with Low Precision Multiplications", arXiv:1412.7024v5 [cs.LG], Sep. 23, 2015, 10 pages.

Gupta, Suyog, et al., "Deep Learning with Limited Numerical Precision", arXiv:1502.02551v1 [cs.LG], Feb. 9, 2015, 10 pages.

Narang, Sharan, et al., "Mixed Precision Training", arXiv:1710.03740v3 [cs.AI], Feb. 15, 2018, 12 pages.

Webb, Chris, "Flexpoint: Numerical Innovation Underlying the Intel® Nervana™ Neural Network Processor", https://www.intel.ai/flexpoint-numerical-innovation-underlying-intel-nervana-neural-network-processor/#gs.ditat6, Nov. 10, 2017, 15 pages.

* cited by examiner

DYNAMIC PRECISION SCALING AT EPOCH GRANULARITY IN NEURAL NETWORKS

CROSS REFERENCE TO RELATED APPLICATIONS

This application claims priority to the U.S. Provisional Patent Application Ser. No. 62/758,853 filed on Nov. 12, 2018 and entitled "Dynamic Precision Scaling at Epoch Granularity," which is hereby incorporated by reference in its entirety.

BACKGROUND

Deep neural networks (DNNs) are a class of artificial neural networks (ANNs) that learn how to perform tasks such as image recognition, natural language processing, and game play. A DNN architecture includes a stack of layers that implement functions to transform an input volume (such as a digital image) into an output volume (such as labeled features detected in the digital image). For example, the layers in a DNN can be separated into convolutional layers that represent convolutional neural networks (CNNs), pooling layers, and fully connected layers. The functions implemented by the layers in a DNN are explicit (i.e., known or predetermined) or hidden (i.e., unknown). For example, a DNN that is used to implement computer vision includes explicit functions (such as orientation maps) and multiple hidden functions in the hierarchy of vision flow.

The functions of a neural network such as a DNN are represented by different sets of parameters for the different layers. Examples of the parameters include connection weights for connections between nodes in the network, activations of the "neurons" in the network, gradients for steepest descent estimations, and the like. The parameters of a convolutional layer define a set of learnable filters (or kernels) that convolve incoming data across the width and height of the input volume to produce a two-dimensional (2-D) activation map of the filter. The parameters of a pooling layer define how an input volume is partitioned into sub-regions. The parameters of a fully connected layer define the high-level reasoning performed by the DNN based on connections to activations in the previous layer, such as a previous pooling layer.

The parameters of the DNN are determined by training the DNN using a training data set that includes a set of input volumes and a corresponding set of (known or labeled) output values. For example, a facial recognition DNN can be trained using images that are known to include the individuals that are to be identified in other images by the facial recognition DNN. The training images are referred to as labeled data, which is defined as a group of samples that have been tagged with one or more labels. During training, the input data from the training data set is sequentially provided to the DNN and errors between the output values generated by the DNN and the known output values are accumulated. The accumulated errors are back propagated to modify parameters of the DNN. The process is repeated until a convergence criterion is satisfied. Each iteration (or "epoch") therefore includes processing the input data, updating the parameters of the DNN based on the errors in the DNN-generated values, and then checking for convergence.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
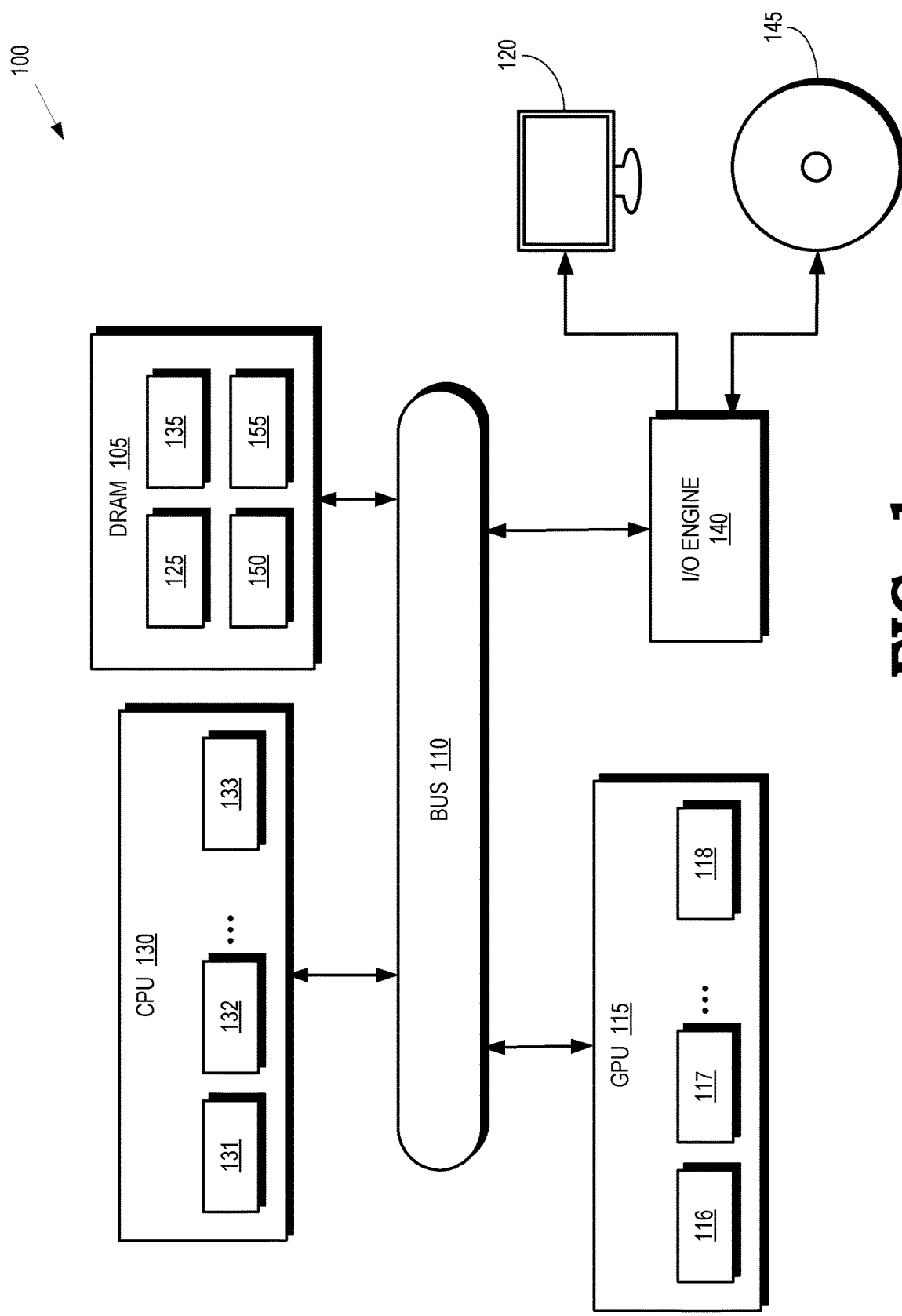
FIG. 1 is a block diagram of a processing system according to some embodiments.

Training a deep neural network (DNN) is a computationally intensive task that can require hours, days, or even months depending on the size of the network. In some cases, performance and performance-per-watt measures for training a DNN and performing inference using the trained DNN are improved by reducing the precision of values of the DNN parameters such as the weights, activations, and gradients. For example, the precision of floating-point values of the DNN parameters can be reduced from 32 bits to 8 bits or even 4 bits without severe loss in accuracy. The precision requirement for the DNN parameters typically gets lower in successive epochs as the error values decrease. Operands used in the DNN perform operations on input values of the DNN parameters and generate output values that are used to determine or modify the DNN parameters. Current dynamic precision scaling methods therefore modify the numerical precision of operands to correspond to the precision requirements for the DNN parameters during training or execution of a DNN by reducing the precision requirements as time (and the number of epochs) increases. However, these techniques ignore variations in the required precision in the spatial dimension, e.g., across the width and height of the input volume, thereby missing opportunities to further enhance the performance (and performance-per-watt) with minimal loss of accuracy.

FIGS. 1-6 disclose embodiments of techniques that enhance performance and performance-per-watt of a deep neural network (DNN) by determining error values (or losses) of samples within an input volume that is provided to the DNN during an epoch. The samples are sorted based on their error values and the samples are grouped into subsets based on their error values. In some embodiments, samples having error values in different ranges are grouped into different subsets corresponding to the magnitudes of the error values in the different ranges. For example, samples having errors within a first range of (relatively high) error values are placed in a first subset, samples having errors within a second range of error values (lower than the first range) are placed in a second subset, etc. The number of subsets can remain the same across epochs or the number can be dynamically adjusted at different epochs, e.g., the number of set sets can be reduced as the number of completed epochs increases. The precisions of operands applied to samples in the different subsets are determined based on the error values associated with the different subsets. In some embodiments, the precision of the operands applied to subsets decreases as the error values of the subsets decreases. For example, higher precision operands such as 32-bit floating-point operands are applied to samples having higher error values and lower precision operands such as 4-bit floating-point operands are applied to samples having lower error values. In some embodiments, a validation error is determined based on a validation set of samples in response to completing an epoch and used to check for overfitting or early stopping. If the validation error for a current epoch increased relative to the validation error for a previous epoch, the precision of the operands applied to the samples within the input volume of the next epoch is increased to its maximum value for all samples.

FIG. 1 is a block diagram of a processing system 100 according to some embodiments. The processing system 100 includes or has access to a memory 105 or other storage component that is implemented using a non-transitory computer readable medium such as a dynamic random access memory (DRAM). However, the memory 105 can also be implemented using other types of memory including static random access memory (SRAM), nonvolatile RAM, and the like. The processing system 100 also includes a bus 110 to support communication between entities implemented in the processing system 100, such as the memory 105. Some embodiments of the processing system 100 include other buses, bridges, switches, routers, and the like, which are not shown in FIG. 1 in the interest of clarity.

The processing system 100 includes a graphics processing unit (GPU) 115 that is configured to render images for presentation on a display 120. For example, the GPU 115 can render objects to produce values of pixels that are provided to the display 120, which uses the pixel values to display an image that represents the rendered objects. Some embodiments of the GPU 115 can also be used for general purpose computing. In the illustrated embodiment, the GPU 115 implements multiple processing elements 116, 117, 118 (collectively referred to herein as "the processing elements 116-118") that are configured to execute instructions concurrently or in parallel. In the illustrated embodiment, the GPU 115 communicates with the memory 105 over the bus 110. However, some embodiments of the GPU 115 communicate with the memory 105 over a direct connection or via other buses, bridges, switches, routers, and the like. The GPU 115 can execute instructions stored in the memory 105 and the GPU 115 can store information in the memory 105 such as the results of the executed instructions. For example, the memory 105 can store a copy 125 of instructions that represent a program code that is to be executed by the GPU 115.

The processing system 100 also includes a central processing unit (CPU) 130 that implements multiple processing elements 131, 132, 133, which are collectively referred to herein as "the processing elements 131-133." The processing elements 131-133 are configured to execute instructions concurrently or in parallel. The CPU 130 is connected to the bus 110 and can therefore communicate with the GPU 115 and the memory 105 via the bus 110. The CPU 130 can execute instructions such as program code 135 stored in the memory 105 and the CPU 130 can store information in the memory 105 such as the results of the executed instructions. The CPU 130 is also able to initiate graphics processing by issuing draw calls to the GPU 115.

An input/output (I/O) engine 140 handles input or output operations associated with the display 120, as well as other elements of the processing system 100 such as keyboards, mice, printers, external disks, and the like. The I/O engine 140 is coupled to the bus 110 so that the I/O engine 140 is able to communicate with the memory 105, the GPU 115, or the CPU 130. In the illustrated embodiment, the I/O engine 140 is configured to read information stored on an external storage component 145, which is implemented using a non-transitory computer readable medium such as a compact disk (CD), a digital video disc (DVD), and the like. The I/O engine 140 can also write information to the external storage component 145, such as the results of processing by the GPU 115 or the CPU 130.

Artificial neural networks, such as a CNN or DNN, are represented as program code that is configured using a corresponding set of parameters. The artificial neural network can therefore be executed on the GPU 115 or the CPU 130, or other processing units including field programmable gate arrays (FPGA), application-specific integrated circuits (ASIC), processing in memory (PIM), and the like. If the artificial neural network implements a known function that can be trained using a corresponding known dataset, the artificial neural network is trained (i.e., the values of the parameters that define the artificial neural network are established) by providing input values of the known training data set to the artificial neural network executing on the GPU 115 or the CPU 130 and then comparing the output values of the artificial neural network to labeled output values in the known training data set. This portion of the process is referred to herein as a "forward pass" through the neural network. Error values (which are also referred to herein as "losses") are determined based on the comparison and back propagated to modify the values of the parameters that define the artificial neural network. This portion of the process is referred to herein as a "backward pass" through the neural network. This process, including a forward pass and a backward pass, is iterated until the values of the parameters satisfy a convergence criterion. Each iteration is referred to herein as an "epoch."

As discussed herein, training artificial neural networks is a computationally intensive task that consumes large amounts of the resources of the processing system 100. The resource requirements of neural networks implemented in the processing system 100 are reduced by representing samples in an input volume at different precisions depending on estimated losses of the samples. Operands having the different precisions are used to process the samples and the resulting model parameters of the neural network are stored at the different precisions. In some embodiments, the neural network is implemented in the GPU 115 (or one or more of the processing elements 116-118), which determines losses of samples within an input volume that is provided to a neural network during a first epoch. The GPU 115 then groups the samples into subsets based on the estimated losses and assigns the subsets to operands in the neural network that represent the samples at different precisions. The GPU 115 processes the subsets in the neural network at the different precisions during the first epoch. Operands having different precisions operate on the samples in the subsets in a forward pass and a backward pass through the neural network. Information 150 representing the samples in the subsets at the different precisions is stored in the memory 105. Some embodiments of the GPU 115 also store information 155 representing model parameters of the neural network in the memory 105 at the different precisions of the subsets of the corresponding samples.

Some embodiments of the processing system 100 modify the partitioning of the samples into subsets in successive epochs. For example, the GPU 115 can partition the samples into a first number of subsets during a first epoch and subsequently modify the number of the subsets to a second number during a second epoch. Potential modifications include decreasing the number of subsets during the second epoch so that the second number is smaller than the first number. This reduction in the number of subsets is used when the estimated losses for the samples decreases, e.g., as the training procedure approaches convergence. For another example, the GPU 115 can modify one or more of the precisions associated with the different subsets. Precisions in a first set are associated with the sample subsets during the first epoch and one or more of these precisions are modified to form a second set of precisions that are associated with the sample subsets during a second, subsequent epoch. One or more of the precisions in the first set can be decreased in the second set, e.g., as the training procedure approaches convergence. In some embodiments, the precisions are set to a maximum value for all the subsets during the second epoch in response to a validation error for the first epoch increasing relative to a validation error of an epoch prior to the first epoch.

Figure 2:
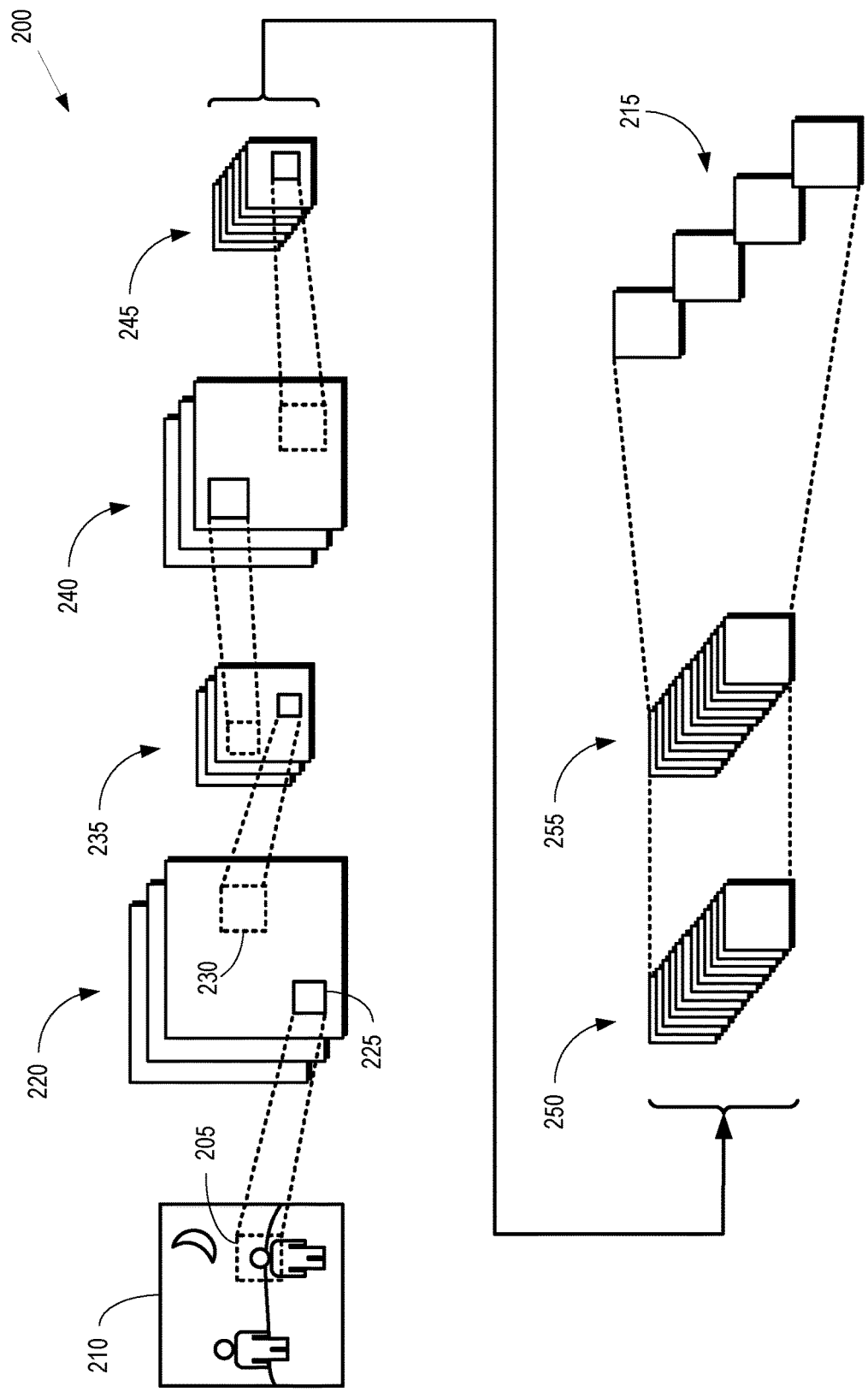
FIG. 2 is a block diagram that illustrates a deep neural network (DNN) that is trained to perform a task such as image recognition according to some embodiments.

FIG. 2 is a block diagram that illustrates a deep neural network (DNN) 200 that is trained to perform a task such as image recognition according to some embodiments. The DNN 200 is executed on the processing elements 116-118 in the GPU 115 or the processing elements 131-133 in the CPU 130 shown in FIG. 1. The DNN 200 is configured to receive input values such as a portion 205 of an image 210 and produce output values 215 on the basis of functions implemented in the DNN 200 and values of parameters that define the functions.

The DNN 200 includes convolutional layers 220 that implement a convolutional function that is defined by a set of parameters, which are trained based on one or more training datasets. The parameters include a set of learnable filters (or kernels) that have a small receptive field and extend through a full depth of an input volume of convolutional layers 220. The parameters can also include a depth parameter, a stride parameter, and a zero-padding parameter that control the size of the output volume of the convolutional layers 220. The convolutional layers 220 apply a convolution operation to input values and provide the results of the convolution operation to a subsequent layer in the DNN 200. For example, the portion 205 of the image 210 is provided as input 225 to the convolutional layers 220, which apply the convolution operation to the input 225 based on the set of parameters to generate a corresponding output value 230. In some embodiments, the convolutional layers 220 are identified as a subnetwork of the DNN 200. The subnetwork then represents a convolutional neural network (CNN). However, the convolutional layers 220 can be a part of a larger subnetwork of the DNN 200 or the convolutional layers 220 can be further subdivided into multiple subnetworks of the DNN 200.

Results generated by the convolutional layers 220 are provided to pooling layers 235 in the DNN 200. The pooling layers 235 combine outputs of neuron clusters at the convolutional layers 220 into a smaller number of neuron clusters that are output from the pooling layers 235. The pooling layers 235 typically implement known (or explicit) functions. For example, pooling layers 235 that implement maximum pooling can assign a maximum value of values of neurons in a cluster that is output from the convolutional layers 220 to a single neuron that is output from the pooling layers 235. For another example, pooling layers 235 that implement average pooling can assign an average value of the values of the neurons in the cluster that is output from the convolutional layers 220 to a single neuron that is output from the pooling layers 235. The known (or explicit) functionality of the pooling layers 235 can therefore be trained using predetermined training datasets. In some embodiments, the pooling layers 235 are identified as a subnetwork of the DNN 200. However, the pooling layers 235 can be a part of a larger subnetwork of the DNN 200 or the pooling layers 235 can be further subdivided into multiple subnetworks of the DNN 200.

In the illustrated embodiment, the DNN 200 also includes additional convolutional layers 240 that receive input from the pooling layers 235 and additional pooling layers 245 that receive input from the additional convolutional layers 240. However, the additional convolutional layers 240 and the additional pooling layers 245 are optional and are not present in some embodiments of the DNN 200. Furthermore, some embodiments of the DNN 200 can include larger numbers of convolutional and pooling layers. The additional convolutional layers 240 and the additional pooling layers 245 can be identified as subnetworks of the DNN 200, portions of subnetworks of the DNN 200, or they can be subdivided into multiple subnetworks of the DNN 200.

Output from the additional pooling layers 245 are provided to fully connected layers 250, 255. The neurons in the fully connected layers 250, 255 are connected to every neuron in another layer, such as the additional pooling layers 245 or the other fully connected layers. The fully connected layers 250, 255 typically implement functionality that represents the high-level reasoning that produces the output values 215. For example, if the DNN 200 is trained to perform image recognition, the fully connected layers 250, 255 implement the functionality that labels portions of the image that have been "recognized" by the DNN 200. Examples of labels include names of people whose faces are detected in the image 210, types of objects detected in the image, and the like. The functions implemented in the fully connected layers 250, 255 are represented by values of parameters that are determined using a training dataset, as discussed herein. The fully connected layers 250, 255 are identified as subnetworks of the DNN 200, portions of subnetworks of the DNN 200, or they are subdivided into multiple subnetworks of the DNN 200.

The operands that are used to implement the DNN 200 have different precisions that correspond to precisions associated with subsets of the samples in the input volumes. For example, an operand can perform a floating-point operation at 32-bit precision for one subset of the samples, at 16-bit precision for another subset of the samples, at 8-bit precision for yet another subset of the samples, and at 4-bit precision for yet another subset of the samples. The DNN 200 can be implemented using different numbers of subsets and corresponding precisions, and the numbers or precisions can be modified at different epochs, as discussed herein. The values of the neural network parameters that are determined using different subsets of the samples are also represented at different precisions that correspond to the precisions of the subsets. For example, the model parameters of the DNN 200 that are determined based on a sample subset at a 32-bit precision are represented and stored in 32-bit precision, whereas the model parameters of the DNN 200 that are determined based on a sample subset at a 4-bit precision are represented and stored in 4-bit precision.

Figure 3:
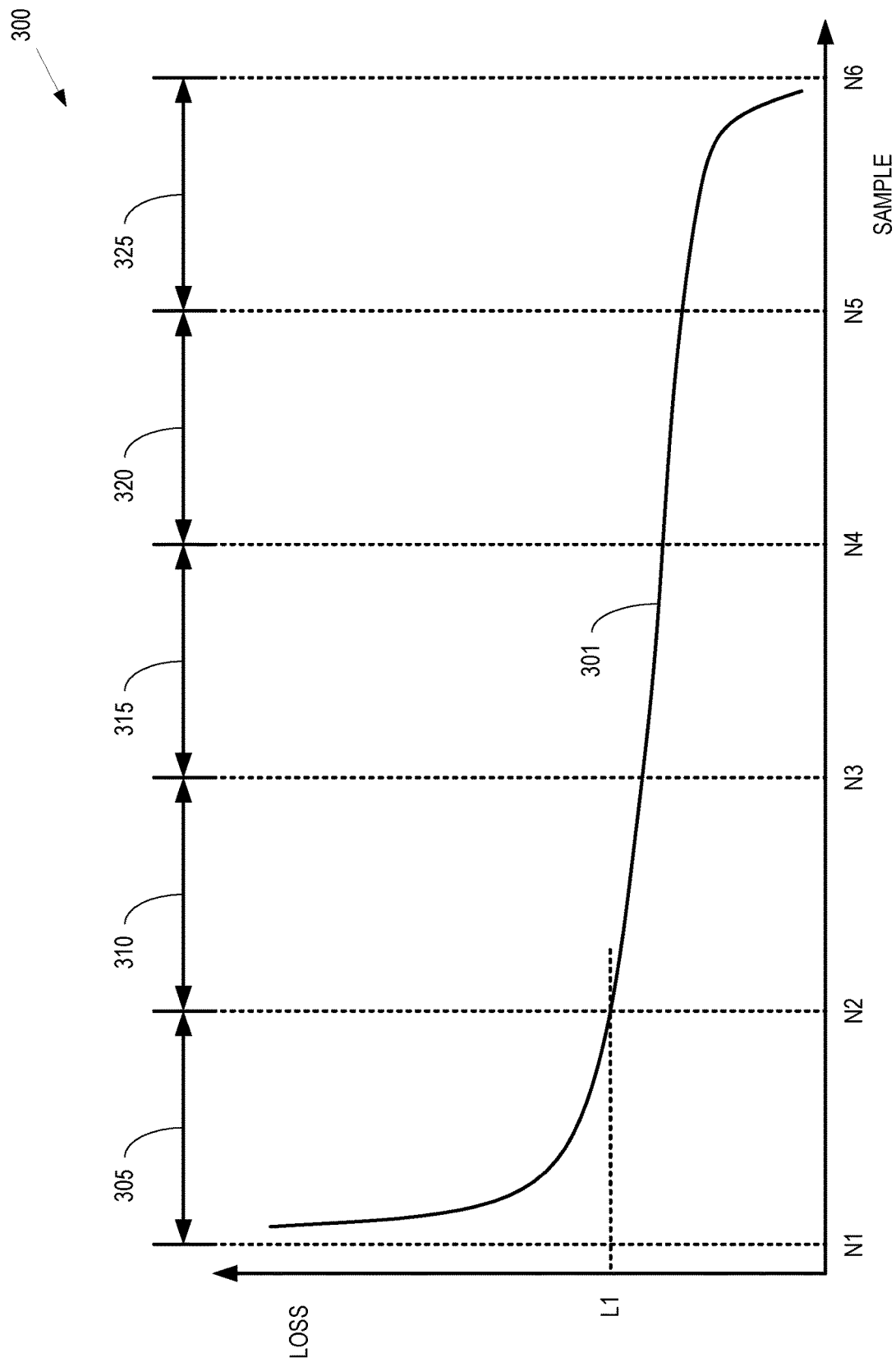
FIG. 3 is a plot of estimated losses for samples in an input volume that is provided to a neural network according to some embodiments.

FIG. 3 is a plot 300 of estimated losses for samples in an input volume that is provided to a neural network according to some embodiments. The vertical axis indicates the estimated loss in arbitrary units and the horizontal axis indicates the sample number. In the illustrated embodiment, the samples have been sorted based on their estimated loss, from the highest estimated loss on the left to the lowest estimated loss on the rate. The curve 301 illustrates the losses of the corresponding samples.

After sorting the samples based on their estimated loss, the samples are grouped into subsets that correspond to different ranges of losses. In the illustrated embodiment, a first subset includes the samples in the range 305 from sample number N1 to sample number N2. The range 305 corresponds to the samples having the highest losses within the input volume in the current epoch. A second subset includes the samples in the range 310 from sample number N2 to N3, which corresponds to samples having lower losses than the range 305 and higher losses than the subsequent ranges. A third subset includes the samples in the range 315 from the sample number N3 to N4, which corresponds to samples having the next lower range of losses relative to the range 310. A fourth subset includes the samples in the range 320 from the sample number N4 to N5, which corresponds to samples having the next lower range of losses relative to the range 315. A fifth subset includes the samples in the range 325 from the sample number N5 to N6, which corresponds to samples having the next lower range of losses relative to the range 320.

The ranges 305, 310, 315, 320, 325 in the plot 300 are defined to include equal numbers of samples in each of the sample subsets. However, in some embodiments the ranges 305, 310, 315, 320, 325 are defined to have different numbers of samples. For example, smaller numbers of samples can be included in ranges associated with portions of the curve 301 that are changing rapidly (i.e., portions of the curve 301 that are characterized by a large derivative), whereas relatively constant portions of the curve 301 are associated with ranges that include larger numbers of samples. For another example, the boundaries of the ranges 305, 310, 315, 320, 325 can be determined based on threshold values of the loss such as defining the range 305 to include samples having a loss above the threshold loss L1. Although the plot 300 illustrates five ranges 305, 310, 315, 320, 325, some embodiments include different numbers of ranges. Moreover, the number of ranges, the boundaries of the ranges, the precisions associated with the ranges, and other characteristics can change from one epoch to another.

Figure 4:
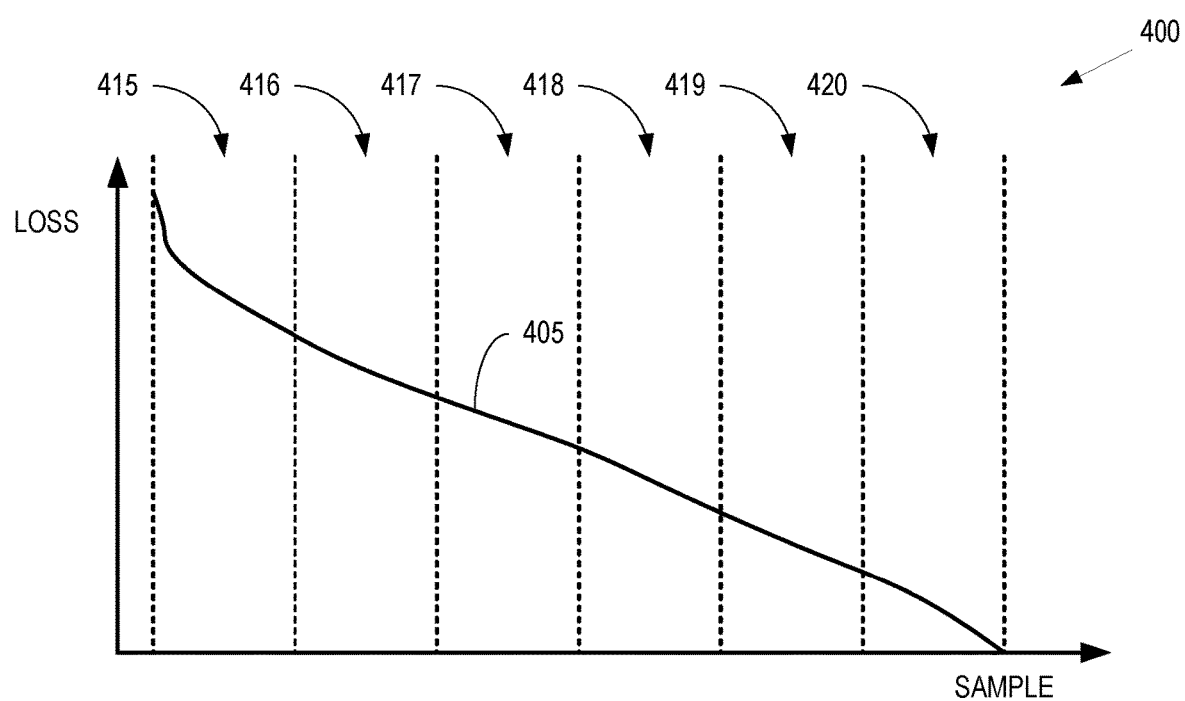
FIG. 4 shows plots of estimated losses for samples in an input volume that is provided to a neural network during a first epoch and a second epoch that is subsequent to the first epoch according to some embodiments.
Figure 4:
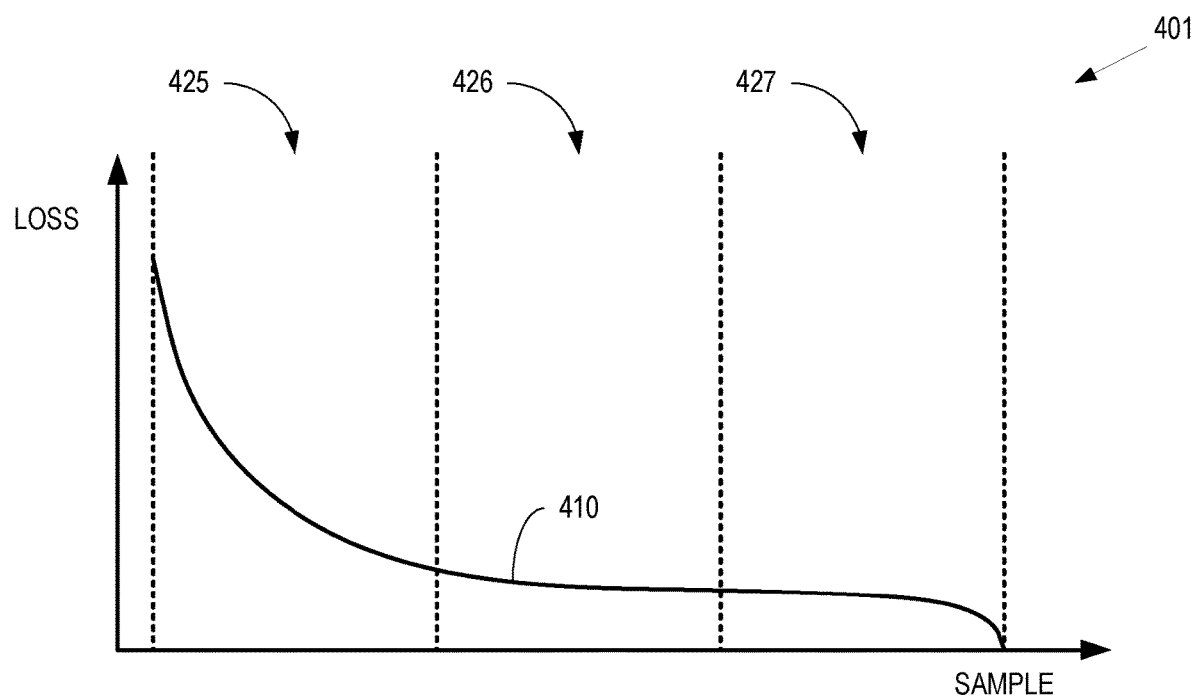

FIG. 4 shows plots 400, 401 of estimated losses for samples in an input volume that is provided to a neural network during a first epoch and a second epoch that is subsequent to the first epoch according to some embodiments. The vertical axes indicate the estimated loss in arbitrary units and the horizontal axes indicate the sample number. In the illustrated embodiment, the samples have been sorted based on their estimated loss, from the highest estimated loss on the left to the lowest estimated loss on the rate. The curves 405, 410 illustrate the losses of the samples that are estimated for the first epoch and the second epoch, respectively.

The samples in the first epoch 400 are sorted according to their estimated losses and then assigned to subsets associated with the ranges 415, 416, 417, 418, 419, 420, which are collectively referred to herein as "the ranges 415-420." The losses of the sorted samples are indicated by the curve 405. The subsets of the samples in the ranges 415-420 are associated with different precisions. The subsets corresponding to larger estimated losses are processed in the neural network using operands that have higher precisions and the subsets corresponding to smaller estimated losses are processed using operands that have lower precisions. For example, the samples in the range 415 are processed by operands in the neural network at a first precision, the samples in the range 416 are processed by operands at a second precision that is lower than the first precision, the samples in the range 417 are processed by operands at a third precision that is lower than the second precision, etc. The number of samples in each of the ranges 415-420 is the same in the first epoch 400.

The estimated losses in the second epoch 401 (represented by the curve 410) are lower relative to the estimated losses in the first epoch 400, as represented by the curve 405. The estimated losses in the second epoch 401 also have a stronger peak at the high-loss end of the curve 410, relative to the curve 405. In response to the lower losses in the second epoch, e.g., as the neural network approaches convergence, the number of ranges is reduced from the six ranges 415-420 used in the first epoch 400 to three ranges 425, 426, 427 in the second epoch 401. In some embodiments, the precisions used in one or more of the ranges 425, 426, 427 are reduced relative to a corresponding range in the first epoch 400. For example, the range 415 can be associated with a 32-bit precision in the first epoch 400 and the corresponding range 425 can be reduced to 16-bit precision in the second epoch 401.

Figure 5:
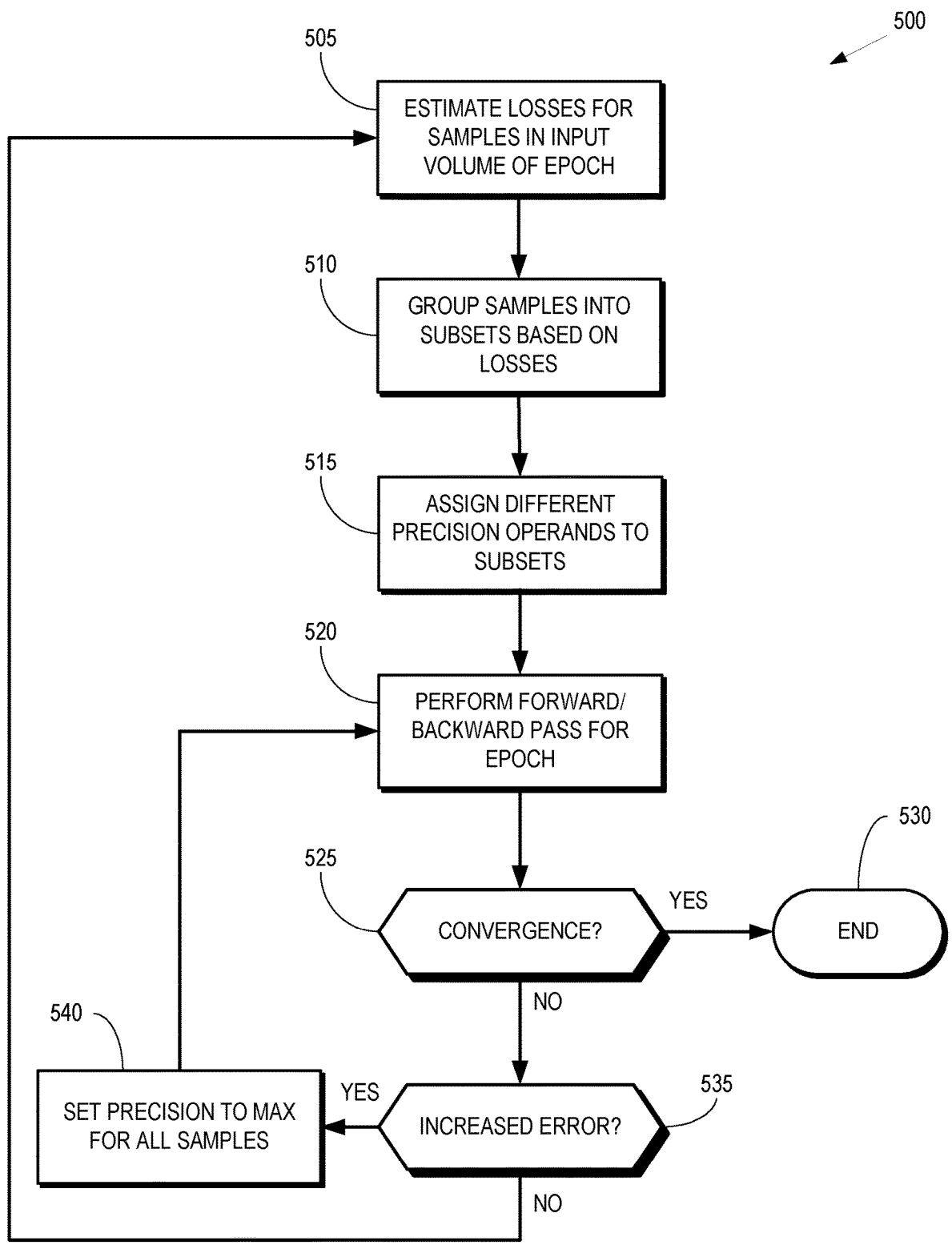
FIG. 5 is a flow diagram of a method of training a neural network to determine model parameters using different precisions for sample subsets in an epic according to some embodiments.

FIG. 5 is a flow diagram of a method 500 of training a neural network to determine model parameters using different precisions for sample subsets in an epic according to some embodiments. The method 500 is implemented in some embodiments of the processing system 100 shown in FIG. 1 and the neural network 200 shown in FIG. 2.

At block 505, losses (also referred to as error values) are estimated for samples in an input volume provided to the neural network during an epoch. At block 510, the samples are sorted according to the magnitude of the losses and then grouped into subsets based on their losses. Samples with relatively high losses are therefore grouped into the same subset as other samples with relatively high losses and samples with relatively low losses are grouped into the same subsets as other samples with relatively low losses.

At block 515, different precisions are assigned to (or associated with) the sample subsets. In some embodiments, higher precisions are assigned to sample subsets having higher losses and lower precisions are assigned to sample subsets having lower losses. The sample subsets associated with the different precisions are therefore processed using operands that are configured to operate on the samples at the corresponding precisions. For example, a sample subset associated with a 32-bit precision is processed using floating-point operands that have 32-bit precision to generate parameters having 32-bit precision and a sample subset associated with a 4-bit precision is processed using floating-point operands that have a 4-bit precision to generate parameters having a 4-bit precision.

At block 520, the samples are input to the neural network and processed in a forward pass through the neural network to generate output values, which are compared to known (or labeled) values to determine the errors or losses associated with the samples. Processing is performed during the forward pass at the precision level indicated by the precision associated with the subset that includes the samples. The losses are then back propagated through the neural network during a backward pass to produce new values of the model parameters for the neural network including connection weights, neuron activations, steepest descent gradients, and the like.

At decision block 525, a convergence check is performed on the neural network to determine whether the training has converged on values of the model parameters that represent the neural network. Convergence is checked using conventional methods such as comparing magnitudes of errors in the current epoch to previous epochs, processing a convergence set in the neural network, and the like. If the convergence check determines that the neural network has converged, the method 500 flows to block 530 and the method 500 ends. If the neural network has not converged, the method 500 flows to decision block 535.

At decision block 535, a validation set is processed in the neural network to determine validation errors. If the validation errors increase from the previous epoch to the current epoch, the method 500 flows to block 540. If the validation errors decreased relative to the previous epoch, the method 500 flows back to block 505 and a subsequent epoch is initiated.

At block 540, the precision for the samples in all the subsets is set to a maximum precision, e.g., 32-bits, in response to the increase in the validation errors. The method 500 then flows to block 520 and the samples are provided to the neural network for a forward pass and the backward pass at the maximum precision.

Figure 6:
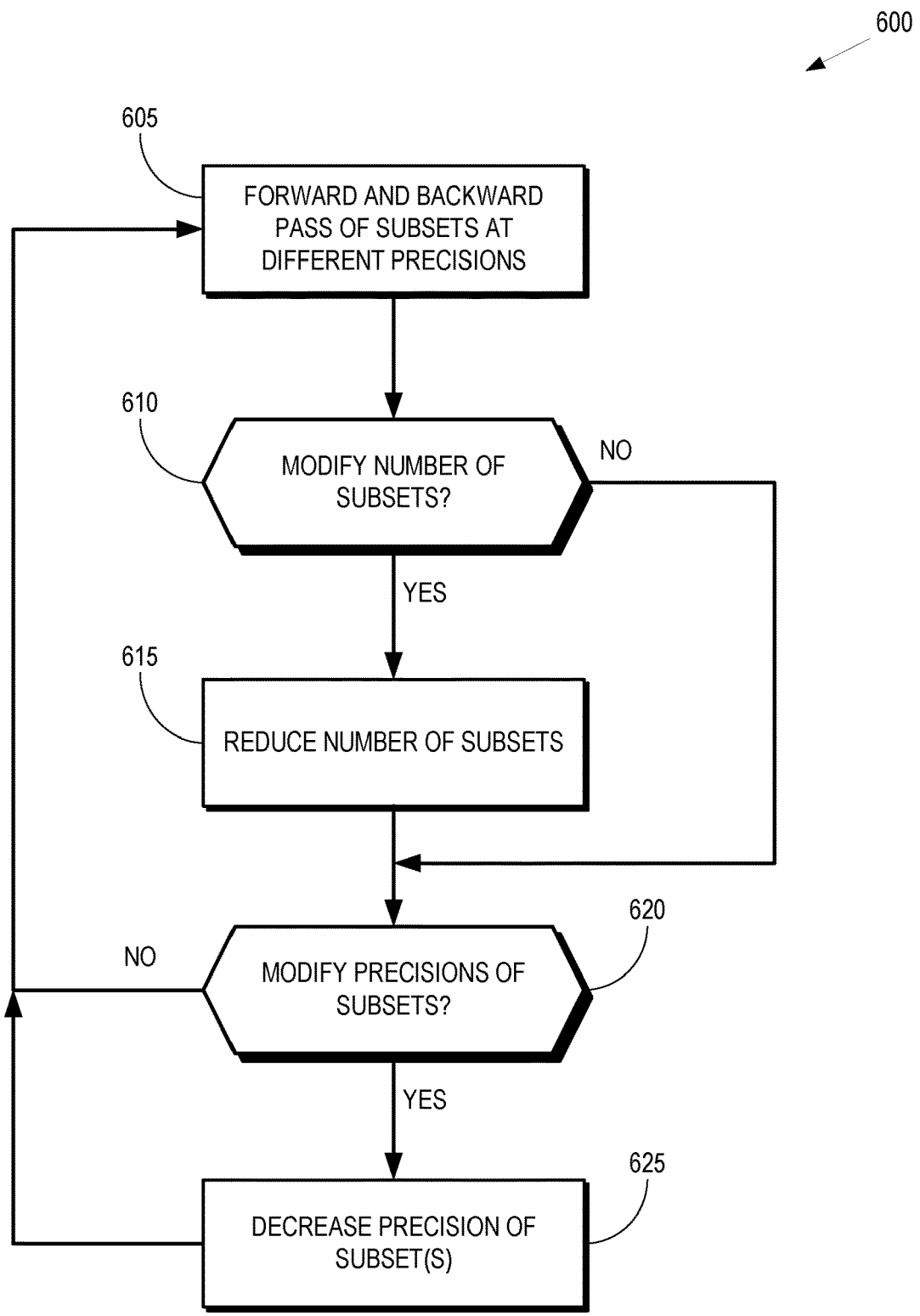
FIG. 6 is a flow diagram of a method of training a neural network to determine model parameters using different precisions for sample subsets in an epic according to some embodiments.

FIG. 6 is a flow diagram of a method 600 of training a neural network to determine model parameters using different precisions for sample subsets in an epic according to some embodiments. The method 500 is implemented in some embodiments of the processing system 100 shown in FIG. 1 and the neural network 200 shown in FIG. 2.

At block 605, forward and backward passes through a neural network are performed for an input volume. The input volume is partitioned into subsets and operands at different precisions are used to perform the forward and backward passes for the different subsets, as discussed herein.

At decision block 610, the processing system determines whether to modify the number of subsets that are used to partition the samples of the input volume. In some embodiments, the decision is based on characteristics of the estimated losses for the samples during the next epoch. For example, the number of subsets is reduced if the estimated losses for the samples decrease, become more concentrated at the high loss or low loss ends of the distribution, become smoother in some portions of the distribution, or in response to other changes in the characteristics of the distribution of losses over the samples. If the processing system determines that the number of subsets is to be modified, the method 600 flows to block 615. Otherwise, the method 600 flows to decision block 620.

At block 615, the processing system reduces the number of subsets that are used to partition the samples of the input volume in response to changes in the characteristics of the estimated losses for the samples. In the illustrated embodiment, the number of subsets is reduced in response to the estimated losses for the samples decreasing. However, other characteristics are used to make other modifications to the number of subsets in some embodiments.

At block decision 620, the processing system determines whether to modify the precisions associated with one or more of the subsets of the samples of the input volume. The decision is based on characteristics of the estimated losses for the samples such as changes in the magnitudes of the estimated losses, changes in the distribution of the estimated losses, and the like. If the processing system determines to modify the precisions, the method 600 flows to block 625. Otherwise, the method 600 flows back to block 605 to begin a subsequent epoch.

At block 625, the processing system decreases the precision associated with one or more of the sample subsets. In the illustrated embodiment, the precision associated with the sample subsets is reduced in response to a decrease in the estimated losses for the samples in the subsets. However, other characteristics are used to make other modifications to the precisions of the subsets in some embodiments. The method 600 then flows to block 605 to begin a subsequent epoch.

A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
    determining losses of samples within an input volume that is provided to a neural network executed by a processor, during a first epoch, the losses being based on a comparison of output values of the neural network to labeled output values in a known training data set;
    grouping, by the processor, the samples into subsets based on the losses;
    assigning, by the processor, the subsets to operands in the neural network that represent the samples at different precisions that correspond to each of the subsets associated with a different precision; and
    training the neural network by processing, by the processor, the subsets in the neural network at the different precisions during the first epoch.

2. The method of claim 1, wherein assigning the subsets to the operands comprises assigning subsets having higher losses to operands having higher precisions.

3. The method of claim 1, wherein processing the subsets comprises determining sets of model parameters for the subsets during at least one of a forward pass and a backward pass through the neural network during the first epoch, wherein each set of model parameters for the subsets is represented at a different corresponding one of the different precisions.

4. The method of claim 3, wherein the sets of model parameters comprise at least one of connection weights for connections between nodes in the neural network, activations of neurons in the neural network, and gradients for steepest descent estimations.

5. The method of claim 1, further comprising:
    modifying a number of the subsets during a second epoch that is subsequent to the first epoch; and
    processing the modified number of the subsets in the neural network at the number of different precisions during the second epoch.

6. The method of claim 5, wherein modifying the number of the subsets comprises decreasing the number of the subsets during the second epoch, relative to the number of the subsets used during the first epoch.

7. The method of claim 1, further comprising:
    modifying at least one of the different precisions during a second epoch that is subsequent to the first epoch.

8. The method of claim 7, wherein modifying the different precisions comprises decreasing the at least one of the different precisions during the second epoch, relative to the different precisions used during the first epoch.

9. The method of claim 1, further comprising:
    determining a validation error based on a validation set in response to completing the first epoch; and
    setting the different precisions to a maximum precision for the subsets during a second epoch that is subsequent to the first epoch in response to the validation error increasing relative to a previously determined validation error.

10. An apparatus comprising:
    a processor configured to:
        determine losses of samples within an input volume that is provided to a neural network executed by the processor, during a first epoch, the losses being based on a comparison of output values of the neural network to labeled output values in a known training data set,
        group the samples into subsets based on the losses,
        assign the subsets to operands in the neural network that represent the samples at different precisions that correspond to each of the subsets associated with a different precision, and
        train the neural network by processing the subsets in the neural network at the different precisions during the first epoch; and
    a memory configured to store information representing the samples in the subsets at the different precisions.

11. The apparatus of claim 10, wherein the processor is configured to assign subsets having higher losses to operands having higher precisions.

12. The apparatus of claim 10, wherein the processor is configured to determine sets of model parameters for the subsets during at least one of a forward pass and a backward pass through the neural network during the first epoch, wherein the sets of model parameters for the subsets are represented at the different precisions.

13. The apparatus of claim 12, wherein the sets of model parameters comprise at least one of connection weights for connections between nodes in the neural network, activations of neurons in the neural network, and gradients for steepest descent estimations.

14. The apparatus of claim 12, wherein the memory is configured to store the sets of model parameters at the different precisions associated with the subsets of the samples.

15. The apparatus of claim 10, wherein the processor is configured to modify a number of the subsets during a second epoch that is subsequent to the first epoch and process the modified number of the subsets in the neural network at the number of different precisions during the second epoch.

16. The apparatus of claim 15, wherein the processor is configured to decrease the number of the subsets during the second epoch, relative to the number of the subsets used during the first epoch.

17. The apparatus of claim 10, wherein the processor is configured to modify at least one of the different precisions during a second epoch that is subsequent to the first epoch.

18. The apparatus of claim 17, wherein the processor is configured to decrease the at least one of the different precisions during the second epoch, relative to the different precisions used during the first epoch.

19. The apparatus of claim 10, wherein the processor is configured to:
    determine a validation error based on a validation set in response to completing the first epoch; and
    set the different precisions to a maximum precision for the subsets during a second epoch that is subsequent to the first epoch in response to the validation error increasing relative to a previously determined validation error.

20. An apparatus comprising:
    a memory; and a processor configured to determine sets of model parameters for a neural network executed by a processor, by providing samples in an input volume for a forward pass and a backward pass through the neural network during a first epoch, wherein the samples are represented at different precisions that are determined based on estimated losses for the samples in the input volume, the estimated losses being based on a comparison of output values of the neural network to labeled output values in a known training data set, and wherein the processor trains the neural network by processing subsets in the neural network at the different precisions during the first epoch and stores the sets of model parameters in the memory at the different precisions for corresponding samples.

* * * * *